Dec. 10, 1968     M. TELKES     3,415,719
COLLAPSIBLE SOLAR STILL WITH WATER VAPOR PERMEABLE MEMBRANE
Filed May 11, 1966

INVENTOR
MARIA TELKES
BY Hurvitz & Rose
ATTORNEYS

3,415,719
COLLAPSIBLE SOLAR STILL WITH WATER VAPOR PERMEABLE MEMBRANE
Maria Telkes, Falls Church, Va., assignor to Melpar, Inc., Falls Church, Va., a corporation of Delaware
Filed May 11, 1966, Ser. No. 549,222
4 Claims. (Cl. 202—83)

ABSTRACT OF THE DISCLOSURE

A solar still has a water vapor permeable bag for retention of brackish water and for use as the evaporator-absorber unit of the still. The spacing between upper and lower walls of the bag, with respect to position of the still in a generally horizontal plane during use, when the bag is filled with brackish water, is limited to approximately 0.25 inch to 0.35 inch. The bag has an inlet for receiving the water to be distilled, is disposed on a thermally insulating buoyant mattress, and is encompassed along its upper and side surfaces by an envelope having an inner water-wettable surface. One of the upper and lower walls of the bag is black, to enhance absorption of solar radiation, and thus ensure rapid heating of the contents of the bag for evaporation of pure water therefrom.

---

The present invention relates generally to saline water conversion, and more particularly to improved solar still apparatus utilizing vapor permeable evaporator reservoirs.

The solar still, of which may versions are known in the prior art, may be generally described as apparatus which takes advantage of solar radiation for converting salt water or brackish water into substantially pure or potable water. The typical prior art solar still designed for sea-going use comprises an inflatable mat having the two-fold purpose of supporting a black porous fiber blanket, which acts as a solar radiation-absorbing layer and saline water distributor and evaporator, and thermally insulating the absorber-evaporator from the sea water surface on which the still floats. Supported above the absorber-evaporator is a transparent canopy or envelope having the dual function of transmitting the solar radiation for incidence on the black absorber-evaporator and of providing a condensing surface for water vapor in confronting relation to the exposed surface of the absorber-evaporator. Because of the reflectivity of water droplets, which if allowed to condense on the inner surface of the envelope would prevent transmission of a substantial amount of solar radiation, the condensing surface is usually treated to enhance condensation of the water vapor as a thin film. The surface of the envelope is inclined to permit the condensate or distillate to run down into a collecting trough or channel from which the pure water is removed as required. The sea-going still is commonly used as emergency equipment to provide drinkable water for the occupants of life-rafts or boats. As such, it is normally designated for reliability, long shelf-life, low weight and small packaged volume.

The land-based solar still utilizes similar components to those employed in sea-going stills, except that the framing is usually rigid and the condenser typically composed of a non-flexible solar radiation-transmissive material, such as glass. Portable solar stills for land use are generally designed more along the lines of the sea-going type.

In any event, when the solar still is to be employed at sea, or in land-going applications where it may be subjected to tossing or jostling, the greatest difficulty encountered in its usage is the spilling of the salt water into the distilled water channel. Since the prior art methods consistently utilize air-gap separation between the sea-water compartment and the fresh water channel, it will readily be appreciated that when the still is displaced from the horizontal, as in use on turbulent seas or in vehicle-mounted applications where rough terrain is encountered, it is extremely difficult to maintain the separation of the sea-water from the fresh water.

It is a principal object of the present invention to provide a portable solar still wherein the problem of intermixing of the distilled water and the saline water is eliminated.

Some of the prior art proposals for solar still design have included the utilization of complicated baffles and inflated tubes in an effort to maintain the separation of the salt-water and the fresh water, but in addition to the complexity of the apparatus required to perform the separation, the danger of contamination by mixing remains ever-present during turbulent environmental conditions.

It is another object of the present invention to provide a solar still wherein separation of the distillate from the liquid being distilled is maintained in a relatively simple and efficient manner, despite subjection of the still to severe environmental turbulence.

The necessity for prevention of even a slight spilling over of the contents of the salt water compartment into the fresh water channel is pointed up when it is realized that distilled water containing more than four percent sea-water is generally classified as "undrinkable." On the other hand, if the distilled water leaks back into the sea-water compartment the distillate yield, and hence, the efficiency of the solar still, is substantially reduced.

Briefly, according to the present invention the solar still is provided with a water vapor permeable bag in place of the conventional flat evaporator blanket. The evaporator bag comprises an upper layer to be exposed to solar radiation, this layer composed of a material permeable only to water vapor, not to liquid water or to salt, and is transparent or translucent to permit passage of incident solar radiation therethrough; and a black, solar radiation-absorbing bottom layer which may be impervious to water vapor as well as to liquid water, if desired. The two layers or walls of the bag are joined and a closable inlet tube is provided through which the bag is filled with saline water. Means are also provided to limit the spacing between the upper and lower walls of the bag, when filled, to approximately 0.25 to 0.35 inch. The salt water is retained inside the bag for any orientation of the solar still relative to the horizontal, and the distilled water may reside in direct physical contact with the bag without danger of contamination. The remaining components of the solar still may be of any conventional design and arrangement.

Accordingly, it is a more specific object of the present invention to provide a solar still utilizing a water vapor permeable evaporator in the form of a bag within which the saline water is contained, so that complete separation is ensured between distillate and liquid being distilled irrespective of orientation of the still relative to the horizontal.

Another feature of the present invention resides in the applicability of the evaporator bag as a completely independent unit for use in drying foods, such as fruit or other edible products which are to be dehydrated. The structure of the bag is similar in all respects to that adapted for use in a saline water conversion system, except that it may have a greater permissible wall separation, when filled, and a larger opening to admit the fresh food. Such a structure permits the water content of the food to evaporate freely, while preventing contamination or disturbance of the food by dust, dirt, insects, birds, or rodents.

It is therefore still another object of the present invention to provide an evaporator bag for drying foods.

The above and still further objects, features, and attendant advantages of the present invention will become apparent from a consideration of the following detailed description of certain preferred exemplary embodiments thereof, especially when taken in conjunction with the accompanying drawings, in which.

Figure 1:
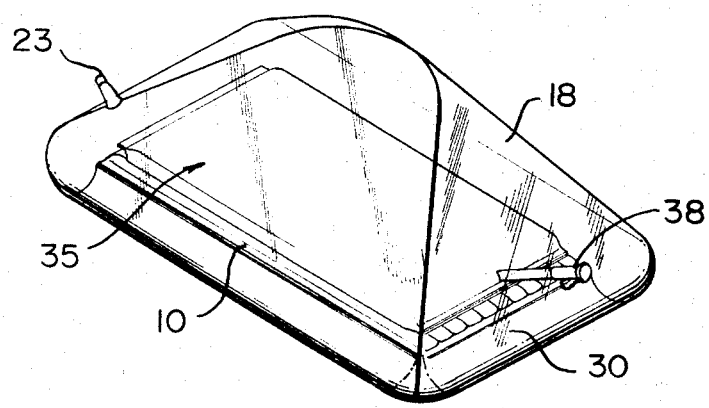
FIGURE 1 is a perspective view of an exemplary embodiment of a solar still in accordance with the invention.
Figure 2:
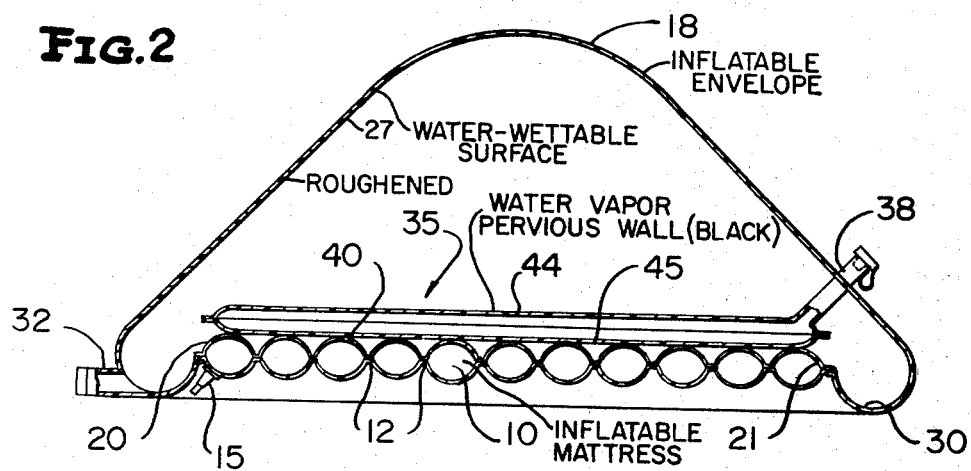
FIGURE 2 is a sectional view of the solar still of FIGURE 1 taken along a longitudinal plane through the axis of symmetry.

Referring now to the drawings, wherein like reference characters are used to designate like components in FIGURES 1 and 2, an exemplary embodiment of a solar still according to the present invention comprises three basic components; (1) means for absorbing solar radiation to heat the saline water to vaporization temperatures and thereby to evaporate fresh water therefrom; (2) means for supporting the absorber-evaporator and for thermally insulating that component from the surface on which the still is disposed; and (3) means for transmitting solar radiation incident upon the still to the absorber-evaporator and for providing a condensing surface for the water vapor. The last-mentioned means may also include a collection trough for the distilled water, or a separate component may be utilized for this purpose, as desired.

It is to be emphasized that these basic components are common to solar stills in general, and that the principal novelty of the present invention resides in the structure and function of the absorber-evaporator unit to be disclosed herein. In other words, the structure and relationship of the other items of which the solar still is comprised are not critical to the invention, provided that they meet the basic requirements which are ordinarily and conventionally deemed to be essential to the proper operation of the still. The solar still, then, may assume any of the wide variety of designs that are known in the art and many include any additional details, also conventional, to enhance the efficiency and operation of the conversion process.

For the sake of completeness and clarity in describing the invention, however, the solar still may take the structure and form shown in FIGURES 1 and 2. Item (2), above, may comprise an inflatable air mattress 10 having a plurality of webs or ribs 12 disposed in parallel relationship interiorly of the mattress walls and joined thereto. Ribs 12 extend in alternation from one or the other of the two opposed sides of the mattress to which they are perpendicular, to a point adjacent to but at least slightly separated from the opposite side. A path is thereby provided for air flow as the mattress is inflated, through a conveniently located closable inflation valve or port 15, for example, while structural rigidity is maintained when the mattress is in the inflated condition.

Item (3), above, may take the form of an inflatable transparent envelope or canopy 18 which, when inflated, assumes a tent-like shape having inclined sides relative to the surface upon which the still is disposed when the latter is in a substantially upright position. Envelope 18 may be joined and sealed to the sides (e.g., 20, 21) of mattress 10 in any conventional manner to permit inflation thereof via a conveniently located closable air-inlet valve, such as 23, and to provide a complete and integral unit.

The envelope is preferably composed of transparent plastic sheet so as to readily admit or transmit the solar radiation incident thereon. Since, as previously mentioned, it is important that water vapor condense on the interior surface of the envelope in a thin film rather than in the form of droplets, to prevent reflection of a substantial amount of the incident solar radiation, the entire inner surface 27 is treated in any conventional manner to render it wettable. For example, envelope 18 may be composed of polyvinyl fluoride, the inner surface of which is covered with an imbedded layer of silica particles. Alternatively, the inner surface 27 may be suitably roughened, such techniques of rendering a surface wettable being well known in the art.

That portion of the envelope adjacent the sides of the mattress 10 may be arranged to form a collection trough 30 extending continuously about the lowermost sides of the solar still and adapted to catch and retain the distilled water which has condensed on and run down the inclined inner surface 27. A closable outlet valve 32 is provided to permit emptying of the contents of the collection trough when the still is in use.

Item (1), above, in accordance with the present invention is a bag or closed container 35 having a closable inlet tube 38 through which saline water or other liquid to be distilled may be introduced into the interior of the bag. Bag 35 is disposed within envelope 18 on the surface 40 of air mattress 10, and may be cemented or otherwise held thereon to prevent shifting when the still is tossed or jolted by high winds, heavy seas or other severe environmental conditions. The inlet end of filler tube 38 projects through a wall of envelope 18 for access by personnel using the still. To prevent the escape of air from the envelope, the intersection of tube 38 and envelope wall is sealed in any conventional manner.

The evaporator bag, 35, is preferably comprised of two separate sheets or layers 44, 45, which are joined at their edges by cementing, heat sealing, or any other convenient method, to prevent leakage of liquid therethrough. Wall 44 of bag 35, disposed in confronting relationship to inner surface 27 of envelope 18 when the bag is positioned in the aforementioned manner within the envelope, is composed of a transparent or translucent water vapor permeable material. Suitable materials are those which will transmit water vapor but are impervious to liquid water or salt, a number of which are known in the art. Such materials have been used for raincoats, exposure suits, and like garments, but have not, insofar as I am aware, been employed as containers or bags for the purpose of transmission of water vapor emanating from liquid water contained therein or for dehydrating foods, or like functions. An example of one suitable embodiment of sheet or wall 44 is a 45–55 blend of butadiene-acrylonitrile copolymer and polyvinyl chloride described in an article by D. Satas, "Porous Sprayed Sheets and Coatings," Industrial and Engineering Chemistry. vol. 57, No. 4 (April 1965), pp. 38–42. Another suitable material is available under the name "Vapotex" from Aldan Rubber Company of Philadelphia, Pa.

The lower sheet 45 of evaporator bag 35 may be either water vapor permeable or impermeable and preferably has a black color to enhance absorption of solar radiation.

When the solar still is in use, solar radiation is transmitted by the transparent envelope 18 and by the transparent or translucent upper wall 44 of the evaporator bag. The incident radiation is absorbed by the black lower wall 45 of the bag to produce heating of the water in the bag and subsequent evaporation of fresh water from this reservoir. The pure water vapor is transmitted by upper sheet 44 (and by the lower sheet 45, if it too is water vapor permeable), while the liquid water and any salt or other precipitate is completely retained within the confines of the bag. The vapor passing through the bag wall or walls condenses on the cooler inner surface 27 of the envelope 18 and flows down the inclined surfaces into the distilled water collection channel or trough 30 from which it is conveniently removed for drinking from outlet tube 32.

I have found that optimum efficiency of the distillation process is obtained when the separation of walls 44 and 45 is limited so as to restrict the water in the bag to a layer on the average of approximately 0.25 to approximately 0.35 inch thickness (depth), when the bag is completely filled. To this end, the two walls may be spot-joined along their inner surfaces, by heat sealing or cementing, or may be non-continuously quilted (i.e., cemented or heated sealed in interrupted lines along those surfaces), thereby allowing the introduced water to fill the bag completely while limiting the average thickness of the water layer to the aforementioned dimensions in a relatively even distribution. Walls 44 and 45 may each have a thickness of from about 10 to 40 mils.

As an alternative to the evaporator bag structure described above, upper layer 44 may be both black and water vapor permeable, in which case heating of the water in the reservoir (bag) occurs from the top surface, through which the vapor is then transmitted. Under these conditions, the inner surface of wall 44 should be in good physical contact with the saline water layer at all times in order to transmit the absorbed solar heat thereto. Since the bag is compressible, the upper wall will tend to follow the enclosed water surface downwardly as evaporation proceeds.

Available water vapor transmittable materials of which the evaporator bag may be comprised are, in the present state of the art, capable of transmitting about 60 to 75 percent as much water vapor as would evaporate from an open water surface of the same area under the same heating conditions. The lower evaporation rate is more than compensated, however, by the simple and complete separation of the distillate from the liquid being distilled and any precipitates of the evaporation process, even under conditions of severe jolting of the still, and by the maintenance of a maximum thickness of water layer in the reservoir. With regard to the latter advantage, it will be realized by those skilled in the solar still art that conventional absorber-evaporator blankets are subject to being covered by too great a layer of water, resulting in inefficient heating, and that some means must be provided to limit the flow and distribution of water on and into the blanket.

The entire solar still which has been described, being flexible, may be conveniently rolled or folded into a relatively small package for storage, and may be rapidly erected by inflation when it is to be placed in service. Again, however, it is to be emphasized that the solar still may take a variety of conventional forms, including the rigid frame version, so that this storage consideration may or may not be available. In any event, it is contemplated that the present invention will be especially useful and desirable where the solar still is of a portable type, as opposed to relatively fixed land-based type.

Figure 3:
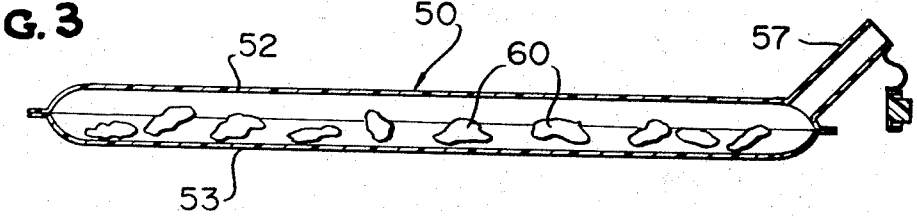
FIGURE 3 is a sectional view of an evaporator bag employed for the drying of food.

FIGURE 3 shows an embodiment of the invention which may be used in the preparation of dehydrated foods. In this example, the bag 50 is similar in all respects to previously described evaporator bag 35, except that the separation of walls 52 and 53 is greater and opening 57 is larger to admit the fresh food. The food to be dried or dehydrated (e.g., fruit such as plums, grapes, figs, et cetera, designated by reference numeral 60) is placed in the evaporator bag via the inlet, after which the inlet tube is closed and the bag exposed directly to solar radiation. As the food is heated, water vapor therefrom escapes freely. The primary advantage of this embodiment is that the food remains uncontaminated by sources external to the bag.

While I have disclosed certain preferred embodiments of my invention, it will be apparent that variations in the specific details of construction which have been illustrated and described may be resorted to without departing from the spirit and scope of the invention as defined in the appended claims.

I claim:
1. A solar still comprising:
a solar radiation-absorbing and water-evaporating enclosure including
a collapsible bag having at least one water vapor pervious, liquid impermeable wall,
the remaining walls of said bag being liquid impermeable,
said bag having at least one black surface exposable to solar radiation,
means for limiting the separation of said at least one wall from the wall opposite thereto to accommodate a water layer of maximum depth in the range from 0.25 to 0.35 inch within said bag, and closable inlet means for introducing brackish water into said bag;
sheet means for transmitting solar radiation, superposed on and separated from said bag, said sheet means having a wettable condensing surface disposed in confronting relationship to said at least one water vapor pervious, liquid impermeable wall;
means for collecting the distillate formed by water vapor condensing on said wettable surface; and
means comprising an inflatable support for thermally insulating said bag from the surface on which said solar still is to reside when in use;
wherein said still is normally oriented, when in use, with said inflatable support means residing in a generally horizontal plane; said absorbing-evaporating enclosure disposed with a wall in direct contact with said inflatable support means and with said water vapor pervious, liquid impermeable wall opposite thereto for exposure to solar radiation; said sheet means being in the form of an inflatable envelope encompassing said water vapor pervious, liquid impermeable wall and the sides of said bag, and sealed to said inflatable support means along the sides thereof to permit inflation of said envelope; the portions of said envelope immediately adjacent the sides of said inflatable support means, forming a trough constituting said distillate collecting means.

2. A buoyant solar still, comprising:
an inflatable transparent plastic envelope,
an inflatable air mattress sealed along its sides to said envelope and forming the bottom closure wall thereof relative to the surface of a body of water on which the still is to be disposed when in use,
a collapsible container for saline water to be distilled disposed on said mattress within said envelope, said container being in the form of a thin bag whose upper and lower walls, relative to said mattress, are limited to a separation distance restricting the depth of saline water in said container to a layer of approximately 0.25 to 0.35 inch, the upper wall of said container being pervious to water vapor and impermeable to liquid water, at least one of said upper and lower walls of said container being black in color to enhance absorption of solar radiation passed via said transparent envelope when said still is in use, said container having a closable inlet conduit projecting through said envelope and sealed thereto,
said envelope having an inner water wettable surface disposed opposite said water vapor pervious, liquid impermeable wall, the portions of said envelope adjacent the sides of said mattress forming a trough, when said envelope is inflated, to collect the water condensing on said inner surface of said envelope when said container is heated by solar radiation and water vapor passes through said upper wall thereof, and
a closable outlet tube connected with said trough to permit removal of distilled water collected therein.

3. The invention according to claim 2 wherein said upper wall of said container is transparent to solar radiation and said lower wall is black in color.

4. The invention according to claim 2 wherein said upper wall of said container is black in color and transfers heat from absorbed solar radiation to said saline water within said container by direct contact therewith as said container collapses in response to evaporation of the water therefrom.

(References on following page)

References Cited

UNITED STATES PATENTS

| | | | |
|---|---|---|---|
| 2,402,737 | 6/1946 | Delano | 203—100 |
| 2,405,118 | 8/1946 | Delano et al. | 202—234 |
| 2,412,466 | 12/1946 | Miller | 202—234 |
| 2,427,262 | 9/1947 | Delano | 202—234 X |
| 2,445,350 | 7/1948 | Ginnings | 202—172 |
| 2,455,834 | 12/1948 | Ushakoff | 202—234 X |
| 2,455,835 | 12/1948 | Ushakoff | 202—234 X |

OTHER REFERENCES

Saline Water Conversion (Symposium) (1957), pp. 137–138, Nat. Acad. of Sciences Publ.

NORMAN YUDKOFF, *Primary Examiner.*

FOLSOM E. DRUMMOND, *Assistant Examiner.*

U.S. Cl. X.R.

202—234, 236, 197; 9—11